(12) United States Patent
Li et al.

(10) Patent No.: US 12,490,062 B2
(45) Date of Patent: Dec. 2, 2025

(54) ELECTRONIC DEVICE, RADIO COMMUNICATION METHOD, AND COMPUTER-READABLE STORAGE MEDIUM

(71) Applicant: Sony Group Corporation, Tokyo (JP)

(72) Inventors: Jian Li, Beijing (CN); Chen Sun, Beijing (CN); Tao Cui, Beijing (CN)

(73) Assignee: SONY GROUP CORPORATION, Tokyo (JP)

( * ) Notice: Subject to any disclaimer, the term of this patent is extended or adjusted under 35 U.S.C. 154(b) by 592 days.

(21) Appl. No.: 17/777,065

(22) PCT Filed: Dec. 21, 2020

(86) PCT No.: PCT/CN2020/137885
§ 371 (c)(1),
(2) Date: May 16, 2022

(87) PCT Pub. No.: WO2021/129549
PCT Pub. Date: Jul. 1, 2021

(65) Prior Publication Data
US 2023/0007446 A1   Jan. 5, 2023

(30) Foreign Application Priority Data
Dec. 26, 2019   (CN) .......................... 201911364959.2

(51) Int. Cl.
*H04W 4/40* (2018.01)
*H04W 4/12* (2009.01)
(Continued)

(52) U.S. Cl.
CPC .............. *H04W 4/12* (2013.01); *H04W 4/40* (2018.02); *H04W 4/44* (2018.02); *H04W 4/46* (2018.02)

(58) Field of Classification Search
CPC ........... H04W 4/12; H04W 4/40; H04W 4/42; H04W 4/44; H04W 4/46; H04W 4/48;
(Continued)

(56) References Cited

U.S. PATENT DOCUMENTS 10,848,932 B2 *  11/2020  Lau ....................... H04W 4/185
2013/0281140 A1 * 10/2013  Rubin .................... G08G 1/167
                                                                455/500
(Continued)

FOREIGN PATENT DOCUMENTS

CN       107222904 A      9/2017
CN       108834098 B     11/2018
(Continued)

OTHER PUBLICATIONS

International Search Report and Written Opinion mailed on Mar. 2, 2021, received for PCT Application PCT/CN2020/137885, Filed on Dec. 21, 2020, 12 pages including English Translation.
(Continued)

*Primary Examiner* — Marcus Hammonds
(74) *Attorney, Agent, or Firm* — XSENSUS LLP

(57) ABSTRACT

The present disclosure relates to an electronic device, a radio communication method, and a computer-readable storage medium. The electronic device of the present disclosure for use in a vehicle is configured to: receive a message, the message comprising a validity time of the message and a validity range of the message; and determine, on the basis of the validity time of the message and of the validity range of the message, whether to forward the message. The use of the electronic device, the radio communication method, and the computer-readable storage medium of the present disclosure optimizes an exchange process for vehicle-related information, thus reducing overhead and delays to the greatest extent, and thereby increasing communication efficiency.

20 Claims, 11 Drawing Sheets

(51) Int. Cl.
*H04W 4/44* (2018.01)
*H04W 4/46* (2018.01)

(58) Field of Classification Search
CPC ....... H04W 4/21; H04W 8/005; H04W 8/186; H04W 48/16; H04W 24/02; H04L 47/32
See application file for complete search history.

(56) References Cited

U.S. PATENT DOCUMENTS

| | | | |
|---|---|---|---|
| 2017/0183003 | A1 | 6/2017 | Ohmura |
| 2019/0088041 | A1* | 3/2019 | Lee ........................ G07C 5/085 |
| 2019/0141603 | A1* | 5/2019 | Vulgarakis Feljan .. H04W 8/26 |
| 2019/0320380 | A1* | 10/2019 | Nylander .............. H04W 48/02 |
| 2020/0137580 | A1* | 4/2020 | Yang .................. H04W 12/122 |

FOREIGN PATENT DOCUMENTS

| | | |
|---|---|---|
| CN | 109561394 A | 4/2019 |
| CN | 110476403 A | 11/2019 |
| JP | 2004287728 A | 10/2004 |
| JP | 2008527824 A | 7/2008 |
| JP | 2019523572 A | 8/2019 |
| KR | 20180111375 A | 10/2018 |
| WO | WO-2014045345 A1 | 3/2014 |
| WO | 2018/018602 A1 | 2/2018 |

OTHER PUBLICATIONS

ZTE et al., "Support of Unicast and Groupcast in NR Sidelink", 3GPP TSG RAN WG2 Meeting #104, R2-1816995, Nov. 12-16, 2018, pp. 1-4.

* cited by examiner

ELECTRONIC DEVICE, RADIO COMMUNICATION METHOD, AND COMPUTER-READABLE STORAGE MEDIUM

CROSS-REFERENCE TO RELATED APPLICATIONS

The present application is based on PCT filing PCT/CN2020/137885, filed Dec. 21, 2020, which claims priority to Chinese Patent Application No. 201911364959.2, titled "ELECTRONIC APPARATUS, WIRELESS COMMUNICATION METHOD, AND COMPUTER READABLE STORAGE MEDIUM", filed on Dec. 26, 2019 with the Chinese Patent Office, the entire contents of each are incorporated herein by reference in its entirety.

FIELD

The embodiments of the present disclosure generally relates to the field of wireless communication, and in particular to an electronic apparatus, a wireless communication method and a computer readable storage medium. More particularly, the present disclosure relates to an electronic apparatus for a vehicle, an electronic apparatus for a road side unit, a wireless communication method performed by the electronic apparatus for a vehicle, a wireless communication method performed by the electronic apparatus for a road side unit, and a computer readable storage medium.

BACKGROUND

Vehicle to infrastructure (V2I) and vehicle to vehicle (V2V) communication technologies are important aspects of Internet-of-things intelligent transportation systems. For example, a vehicle may communicate with an RSU (road side unit) located on a roadside and other surrounding vehicles by broadcasting. There are many kinds of information exchanged between the vehicle and the infrastructure and between the vehicle and other vehicles, such as intersection control, dynamic special lane management, dynamic optimization of traffic signals, intelligent parking, and electronic payment services, which causes a large amount of information interaction between the vehicle and the infrastructure and between the vehicle and other vehicles, resulting in a delay of information and reduction of communication efficiency.

Therefore, it is required to provide a technical solution to optimize interaction of information related to vehicles, so as to minimize overhead and time delay, thereby improving the communication efficiency.

SUMMARY

This section provides a general summary of the present disclosure rather than a comprehensive disclosure of a full scope or all features of the present disclosure.

An objective of the present disclosure is to provide an electronic apparatus, a wireless communication method and a computer readable storage medium to optimize interaction of information related to vehicles, so as to minimize overhead and time delay, thereby improving the communication efficiency.

According to an aspect of the present disclosure, an electronic apparatus for a vehicle is provided. The electronic apparatus includes processing circuitry. The processing circuitry is configured to: receive a message including an effective time of the message and an effective range of the message; and determine, according to the effective time of the message and the effective range of the message, whether to forward the message.

According to another aspect of the present disclosure, an electronic apparatus for a road side unit is provided. The electronic apparatus includes processing circuitry. The processing circuitry is configured to: determine an effective time of a message and an effective range of the message; generate the message including the effective time and the effective range; and send the message to a vehicle, for the vehicle to determine, according to the effective time of the message and the effective range of the message, whether to forward the message.

According to another aspect of the present disclosure, an electronic apparatus for a road side unit is provided. The electronic apparatus includes processing circuitry. The processing circuitry is configured to: divide, according to destinations of multiple vehicles, the multiple vehicles into one or more groups, where vehicles in the same group have the same destination; receive a map request message for requesting a map message from a vehicle; determine a map message of a group to which the vehicle belongs; and send the map message of the group to which the vehicle belongs.

According to another aspect of the present disclosure, a wireless communication method performed by an electronic apparatus for a vehicle is provided. The method includes: receiving a message including an effective time of the message and an effective range of the message; and determining, according to the effective time of the message and the effective range of the message, whether to forward the message.

According to another aspect of the present disclosure, a wireless communication method performed by an electronic apparatus for a road side unit is provided. The method includes: determining an effective time of a message and an effective range of the message; generating the message, where the message includes the effective time and the effective range; and sending the message to a vehicle, for the vehicle to determine, according to the effective time of the message and the effective range of the message, whether to forward the message.

According to another aspect of the present disclosure, a wireless communication method performed by an electronic apparatus for a road side unit is provided. The method includes: dividing, according to destinations of multiple vehicles, the multiple vehicles into one or more groups, where vehicles in the same group have the same destination; receiving a map request message for requesting a map message from a vehicle; determining a map message of a group to which the vehicle belongs; and sending the map message of the group to which the vehicle belongs.

According to another aspect of the present disclosure, a computer readable storage medium is provided. The computer readable storage medium includes executable computer instructions that, when being executed by a computer, cause the computer to perform the wireless communication method according to the present disclosure.

With the electronic apparatus, the wireless communication method and the computer readable storage medium according to the present disclosure, the message sent to the vehicle includes the effective time and the effective range of the message, so that the vehicle determines whether to forward the message. In this way, the vehicle may forward only part of the message, so as to minimize the overhead and time delay, thereby improving the communication efficiency.

A further applicable field becomes apparent from the description herein. The description and specific examples in the summary are only illustrative and are not intended to limit the scope of the present disclosure.

BRIEF DESCRIPTION OF THE DRAWINGS

The drawings described herein are used for illustrating the selected embodiments only rather than all of possible embodiments, and are not intended to limit the scope of the present disclosure. In the drawings.

Figure 1:
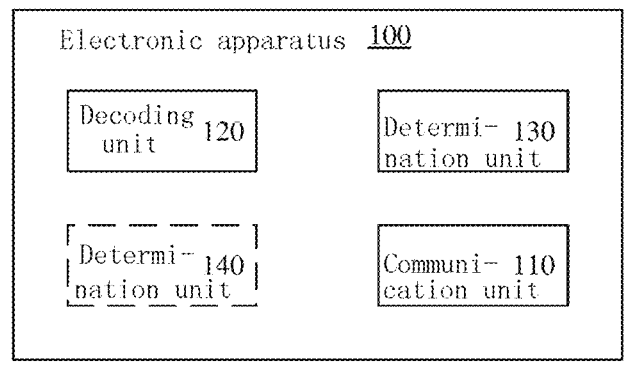
FIG. 1 is a block diagram showing an example of configuration of an electronic apparatus for a vehicle according to an embodiment of the present disclosure.

Although the present disclosure is susceptible to various modifications and substitutions, specific embodiments thereof are shown in the drawings as examples and are described in detail herein. However, it should be understood that the description of specific embodiments herein is not intended to limit the present disclosure into a disclosed specific form. Instead, the present disclosure aims to cover all modifications, equivalents and substitutions falling within the spirit and the scope of the present disclosure. It should be noted that, corresponding reference numerals indicate corresponding components throughout the drawings.

DETAILED DESCRIPTION OF EMBODIMENTS

Now, examples of the present disclosure are described more fully with reference to the drawings. The following description is merely illustrative in nature and is not intended to limit the present disclosure and application or use.

Exemplary embodiments are provided so that the present disclosure can become exhaustive and the scope of the present disclosure can be fully conveyed to those skilled in the art. Examples of various specific details such as specific components, apparatuses, and methods are set forth to provide detailed understanding of the embodiments of the present disclosure. It is apparent to those skilled in the art that without specific details, the exemplary embodiments may be implemented in multiple different forms, none of which is construed as limiting the scope of the present disclosure. In some exemplary embodiments, well-known processes, well-known structures, and well-known technologies are not described in detail.

The present disclosure is described in the following order:
1. Configuration Example of Electronic Apparatus for Vehicle
2. Configuration Example of Electronic Apparatus for Road Side Unit
3. Method Embodiment
4. Application Example

1. Configuration Example of Electronic Apparatus for Vehicle

FIG. 1 is a block diagram showing an example of configuration of an electronic apparatus 100 according to an embodiment of the present disclosure. The electronic apparatus 100 herein may be used for a vehicle, for example, a terminal apparatus arranged in the vehicle or integrated in the vehicle. Further, the electronic apparatus 100 may communicate with a server located at a network side or in the cloud through an RSU. The communication between the electronic apparatus 100 and the RSU may be in a form of broadcasting.

As shown in FIG. 1, the electronic apparatus 100 may include a communication unit 110, a decoding unit 120, and a determination unit 130.

Here, units of the electronic apparatus 100 may be included in a processing circuit. It should be noted that the electronic apparatus 100 may include one processing circuitry or multiple processing circuitry. Further, the processing circuitry may include various separate functional units to perform various functions and/or operations. It should be noted that these functional units may be physical entities or logical entities, and units with different names may be implemented by one physical entity.

According to the embodiment of the present disclosure, the decoding unit 120 and the determination unit 130 of the electronic apparatus 100 may be integrated in a calculation control unit in the intelligent vehicle end, and the communication unit 110 may be realized through an OBU (On Board Unit).

According to the embodiment of the present disclosure, the electronic apparatus 100 may receive a message through the communication unit 110.

According to the embodiment of the present disclosure, the decoding unit 120 may decode the message to acquire an effective time and an effective range of the message included in the message.

According to the embodiment of the present disclosure, the determination unit 130 may determine whether to forward the message according to the effective time of the message and the effective range of the message.

In this way, the message includes the effective time and effective range of the message, so that the electronic apparatus 100 may determine whether to forward the message. That is, the electronic apparatus 100 may forward only part of the message, thereby minimizing overhead and time delay, thereby improving the communication efficiency.

According to the embodiment of the present disclosure, the effective time of the message may include a start time of the message and an end time of the message. That is, the message is valid in a time range from the start time to the end time. Alternatively, the effective time of the message may include the start time and the effective time range of the message. That is, the message is valid within the valid time range from the start time. Apparently, the effective time of the message may further include parameters in other forms, as long as the effective time characterizes the range of the effective time of the message.

According to the embodiment of the present disclosure, the determination unit 130 may determine whether a current time is within the effective time of the message. For example, in a case that the effective time of the message includes the start time of the message and the end time of the message, the determination unit 130 may determine whether the current time is between the start time and the end time.

According to the embodiment of the present disclosure, the effective range of the message may include a location of the message source and an effective radius of the message. That is, the message is valid in a circular area with the message source as a center and the effective radius as a radius. Alternatively, the effective range of the message may be other shapes, so that parameters in other forms may further be included.

According to the embodiment of the present disclosure, the determination unit 130 may determine whether the position of the electronic apparatus 100 is within the effective range of the message. Here, the electronic apparatus 100 may include, for example, a GPS unit to acquire position information of the electronic apparatus 100. Alternatively, the electronic apparatus 100 may determine the position of the electronic apparatus 100 in other ways, for example, through RTCM (Radio Technical Commission for Maritime services) differential signal messages from multiple base station apparatus.

According to the embodiment of the present disclosure, in a case that the determination unit 130 determines that the current time is within the effective time of the message and the position of the electronic apparatus 100 is within the effective range of the message, it is determined that the electronic apparatus 100 forwards the message. For example, the electronic apparatus 100 may forward the message in a form of broadcasting.

According to the embodiment of the present disclosure, in a case that the determination unit 130 determines that the current time is not within the effective time of the message, or determines that the position of the electronic apparatus 100 is not within the effective range of the message, or determines that the current time is not within the effective time of the message and the position of the electronic apparatus 100 is not within the effective range of the message, the determination unit 130 may determine that the electronic apparatus 100 does not forward the message.

According to the embodiment of the present disclosure, in a case that the electronic apparatus 100 does not forward the message, the electronic apparatus 100 may discard the message. In addition, in a case that the electronic apparatus 100 does not forward the message, the electronic apparatus 100 may not display the message to a driver driving the vehicle. That is, the electronic apparatus 100 may filter out some information to cause the information displayed to the driver proper and effective.

According to the embodiment of the present disclosure, the decoding unit 120 may decode the message to determine priority of the message. Here, the priority of the message represents importance of the message. For example, priority of a message representing a traffic accident may be higher than that of a map message.

According to the embodiment of the present disclosure, in a case that the determination unit 130 determines that the electronic apparatus 100 forwards the message, the determination unit 130 may further determine an order of forwarding the message according to the priority of the message. For example, the electronic apparatus 100 may forward the messages in a descending order of priority.

According to the embodiment of the present disclosure, the decoding unit 120 may decode the message to determine service type information included in the message. The service type information represents a current scene of the electronic apparatus 100, for example, a scene in which vehicles import and export, a scene in which a fleets passes a toll station, a scene of intelligent parking, a scene in which a vehicle updates a map, and a scene of dynamic grouping based on path planning. Here, the service type information may be represented by a service type serial number.

According to the embodiment of the present disclosure, the decoding unit 120 may decode the message to determine object type information included in the message. The object type information may include types of all objects (such as the vehicles and the RSU) in a scene where the electronic apparatus 100 is currently in. The object type may include, for example, a vulnerable road user, an RSU, a fleet and the like. Here, the object type information may be represented by an object type serial number.

As described above, according to the embodiment of the present disclosure, the message received by the electronic apparatus 100 may include at least one of: the effective time of the message, the effective range of the message, the priority of the message, the service type information, and the object type information.

According to the embodiment of the present disclosure, the messages received by the electronic apparatus 100 include but are not limited to: Basic Safety Message (BSM), map message, road side unit message, road side safety message, RTCM differential signal message and signal lamp message. The messages are described separately below.

The BSM message is sent by the vehicle in a form of broadcasting, so that a real-time state of the vehicle is sent to a surrounding vehicle. That is, the electronic apparatus 100 may receive the BSM message from other vehicle. Pseudo codes of the BSM message according to the embodiment of the present disclosure are as follows.

```
BasicSafetyMessage ::= SEQUENCE{
    msgCnt MsgCount,
    id OCTET STRING (SIZE(8)),
    --vehicle ID,
    plateNo OCTET STRING (SIZE(4..16)) OPTIONAL,
    --Reserved for Electronic Vehicle Identification
    vtp Valid_Time_Period,
    vca Valid_Coverage_Area,
    service Service,
    object Object,
    mp Message_Priority,
    secMark DSecond,
    pos Position3D,
    accuracy PositionConfidenceSet,
    transmission TransmissionState,
    speed Speed,
    heading Heading,
    angle SteeringWheelAngle OPTIONAL,
    motionCfd MotionConfidenceSet OPTIONAL,
    accelSet AccelerationSet4Way,
    brakes BrakeSyetemStatus,
    size VehicleSize,
    vehicelClass VehicleClassification,
    --VehicleClassification includes Basic VehicleClass and other extendible type
    safetyExt VehicleSafetyExtensions OPTIONAL
    ...
}
```

In the above codes, Basicsafetymessage represents the BSM. vtp Valid_Time_Period represents the effective time of the message. vca Vlid_Coverage_Area represents the valid range of the message. service Service represents the service type. object Object represents the object type. mp Message_Priority represents the priority of the message.

The map message is sent by the RSU in a form of broadcasting to send map information of a local area to the vehicle. The map message includes intersection information, road section information, lane information, connection between roads and the like. That is, the electronic apparatus 100 may receive the map message from the RSU. Pseudo codes of the map message according to the embodiment of the present disclosure are as follows.

```
MapData ::= SEQUENCE {
    msgCnt MsgCount,
    timeStamp MinuteOfTheYear OPTIONAL,
    vtp Valid_Time_Period,
    vca Valid_Coverage_Area,
    service Service,
    object Object,
    mp Message_Priority,
    nodes NodeList,
    --intersections or road endpoints
    ...
}
```

In the above codes, MapData represents the map message. vtp Valid_Time_Period represents the effective time of the message. vca Valid_Coverage_Area represents the effective range of the message. service Service represents the service type. object Object represents the object type. mp Message_Priority represents the priority of the message.

The road side unit message is sent by the RSU in a form of broadcasting to send traffic event and traffic sign information to the surrounding vehicle. That is, the electronic apparatus 100 may receive the road side unit message from the RSU. Pseudo codes of the road side unit message according to the embodiment of the present disclosure are as follows.

```
RoadSideInformation ::= SEQUENCE {
    msgCnt MsgCount,
    timeStamp MinuteOfTheYear OPTIONAL,
    id OCTET STRING (SIZE(8)),
    --RSU ID
    rsiId INTEGER (0..255),
    --local ID of this rsi information set by RSU
    alertType AlertType,
    vtp Valid_Time_Period,
    vca Valid_Coverage_Area,
    service Service,
    object Object,
    mp Message_Priority,
    --Text message warning or Traffic sign type according to China GB5768
    description IA5String (SIZE(1..256)) OPTIONAL,
    --Text message if alertType=0
    --Additional description to the traffic sign if alertType > 0
    --e.g. describe the subtype of the traffic sign
    priority Priority OPTIONAL,
    --the urgency of this message, a relative
    --degree of merit compared with other
    --similar message for this type (not other message being sent by the device), nor a priority of display urgency
    refPos Position3D,
    --Position of traffic alert (traffic sign or incident)
    alertPath PathPointList,
    --Warning is active if vehicle is within this path
    --Points are listed from upstream to downstream
    --along the vehicle drive direction.
    --One path includes at least two points.
    alertRadius Radius,
    --The biggest distance away from the alert path
    --within which the warning is active.
    ...
}
```

In the above codes, RoadSideInformation represents the road side unit message. vtp Valid_Time_Period represents the effective time of the message. vca Valid_Coverage_Area represents the effective range of the message. service Service represents the service type. object Object represents the object type. mp Message_Priority represents the priority of the message.

The road side safety message is sent by the RSU in a form of broadcasting, to send the real-time state information of a surrounding traffic participant, such as a vehicles and a passenger to a surrounding vehicle. That is, the electronic apparatus 100 may receive the road side safety message from the RSU. Pseudo codes of the road side safety message according to the embodiment of the present disclosure are as follows.

```
RoadsideSafetyMessage ::= SEQUENCE {
    msgCnt MsgCount,
    id OCTET STRING (SIZE(8)),
    --RSU ID
    refPos Positon3D,
    vtp Valid_Time_Period,
    vca Valid_Coverage_Area,
    service Service,
    object Object,
    mp Message_Priority,
    --Reference position of this RSM message
    participants ParticipantList,
    --All or part of the participants detected by RSU
    ...
}
```

In the above codes, RoadsideSafetyMessage represents the road side safety message. vtp Valid_Time_Period represents the effective time of the message. vca Valid_Coverage_Area represents the effective range of the message. service Service represents the service type. object Object represents the object type. mp Message_Priority represents the priority of the message.

The RTCM differential signal message is sent to the vehicle by a network side apparatus such as a base station apparatus. Alternatively, the RTCM differential signal message may be transmitted between vehicles for the vehicles to determine positions of the vehicles according to position information of the network side apparatus. That is, the electronic apparatus 100 may receive the RTCM differential signal message from the network side apparatus or other vehicle. Pseudo codes of the RTCM differential signal message according to the embodiment of the present disclosure are as follows.

```
RTCMcorrections ::= SEQUENCE {
    msgCnt MsgCount,
    rev RTCM-Revision,
    --the specific edition of the standard
    --that is being sent
    timeStamp MinuteOfTheYear OPTIONAL,
    vtp Valid_Time_Period,
    vca Valid_Coverage_Area,
    service Service,
    object Object,
    mp Message_Priority,
    --Observer position, if needed
    anchorPoint FullPositionVector OPTIONAL,
    --RTCM message
    msg RTCMmessage,
    ...
}
```

In the above codes, RTCMcorrections represents the RTCM differential signal message. vtp Valid_Time_Period represents the effective time of the message. vca Valid_Coverage_Area represents the effective range of the message. service Service represents the service type. object Object represents the object type. mp Message_Priority represents the priority of the message.

The signal lamp message is sent by the RSU in a form of broadcasting, to send current state information of one or more intersection signal lamps to a surrounding vehicle. That is, the electronic apparatus 100 may receive the signal lamp message from the RSU. Pseudo codes of the signal lamp message according to the embodiment of the present disclosure are as follows.

```
SPAT ::= SEQUENCE {
    msgCnt MsgCount,
    timeStamp MinuteOfTheYear OPTIONAL,
    name DescriptiveName OPTIONAL,
    vtp Valid_Time_Period,
    vca Valid_Coverage_Area,
    service Service,
    object Object,
    mp Message_Priority,
    --human readable name for this collection
    --to be used only in debug mode
    intersections IntersectionStateList,
    --sets of SPAT data (one per intersection)
    ...
}
```

In the above codes, SPAT represents the signal lamp message. vtp Valid_Time_Period represents the effective time of the message. vca Valid_Coverage_Area represents the effective range of the message. service Service represents the service type. object Object represents the object type. mp Message_Priority represents the priority of the message.

As described above, according to the embodiment of the present disclosure, each of the conventional BSM, map message, road side unit message, road side safety message, RTCM differential signal message and signal lamp message related to the vehicle includes at least one of the following information: the effective time of the message, the effective range of the message, the priority of the message, the service type information and the object type information. In this way, the amount of information required to be forwarded is greatly reduced, so as to reduce the overhead and time delay, thereby improving the communication efficiency. Apparently, in a case of other message related to the vehicle, the other message may include at least one of the above information. That is, the embodiments of the present disclosure are applicable to any message related to the vehicle.

According to an embodiment of the present disclosure, a new message is defined, that is, a Vulnerable Road User (VRU) message. Here, the vulnerable road user may include a traffic participant whose transportation means is not a vehicle, such as a cyclist, an electric biker, a motorcycle, and a pedestrian. In other words, the vulnerable road user refers to a traffic participant (a cyclist, an electric biker, a motorcycle) that is exposed outside a vehicle or a traffic participant (a pedestrian) not having a vehicle. This message is sent by a vulnerable road user to a surrounding vehicle. For example, the vulnerable road user may send the message through a wearable electronic device, a handheld electronic device, or an electronic device integrated in a vehicle (such as a bicycle, an electric vehicle or a motorcycle) for the vulnerable road user.

According to an embodiment of the present disclosure, as shown in FIG. 1, the electronic apparatus 100 may further include a determination unit 140 configured to determine a driving strategy of the vehicle according to physiological parameters of the vulnerable road user included in the message received from the vulnerable road user.

According to an embodiment of the present disclosure, the physiological parameters include but are not limited to: a height, an age, a gender, a blood pressure, a body temperature, a heart rate and a mood. Here, the electronic apparatus for the vulnerable road user includes a sensor for detecting various physiological parameters in real time. In addition, the physiological parameters such as the height, the age and the gender may further be manually inputted to the electronic apparatus by vulnerable road user.

According to an embodiment of the present disclosure, the information received from the vulnerable road user may further include type information of the vulnerable road user, such as a cyclist, an electric biker, a motorcyclist, the elderly, the disabled, or a child. In addition, the information received from the vulnerable road user may further include speed information of the vulnerable road user.

According to an embodiment of the present disclosure, the determination unit 140 may determine whether to avoid the vulnerable road user according to the information received from the vulnerable road user. For example, in a case that the vulnerable road user is old, has a high blood pressure, has a high temperature and belongs to the vulnerable group, or a speed of the vulnerable road user is fast, the determination unit 140 may determine to avoid the vulnerable road user.

Figure 2:
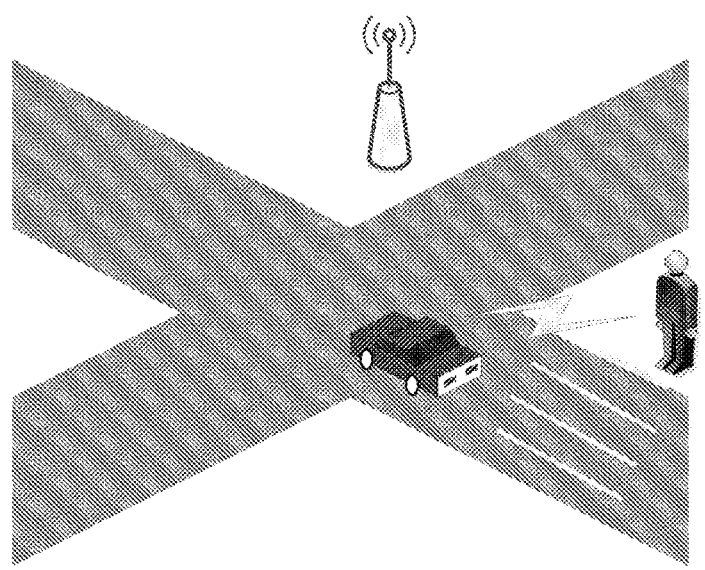
FIG. 2 is a schematic diagram showing a scenario of information interaction between a vulnerable road user and a vehicle according to an embodiment of the present disclosure.

FIG. 2 is a schematic diagram showing a scenario of information interaction between a vulnerable road user and a vehicle according to an embodiment of the present disclosure. As shown in FIG. 2, a pedestrian on the roadside directly communicates with the vehicle through the VRU message, which speeds up delivery of the message and reduces a delay of the message. In addition, the vehicle adjusts a driving strategy according to the VRU message to reduce occurrence of traffic accidents.

Pseudo codes of the VRU message according to the present disclosure is as follows.

```
VulnerableRoadUserMessage ::= SEQUENCE {
    msgCnt MsgCount,
    id OCTET STRING (SIZE(8)),
    ptcData ParticipantData,
}
```

In the above codes, VulnerableRoadUserMessage represents the VRU message. ptcData ParticipantData represents data information of the vulnerable road user, which includes physiological parameters, speed information, type information and the like.

According to an embodiment of the present disclosure, another new message is defined, which is referred to as a control message. The message is generated and sent by a vehicle, especially a head vehicle in a fleet. The control message includes identification information (a group ID) of the fleet, which is convenient for the head vehicle to manage the fleet.

According to an embodiment of the present disclosure, each of the above messages is in an application layer. In other words, a message body of each of the above messages is arranged in a message sublayer of the application layer, so that a session program may be directly defined in the message sublayers, simplifying information interaction.

Further, according to an embodiment of the present disclosure, a structure of each of the above messages may include a message frame. The message frame includes a data frame, and the data frame is composed of data elements.

Figure 3:
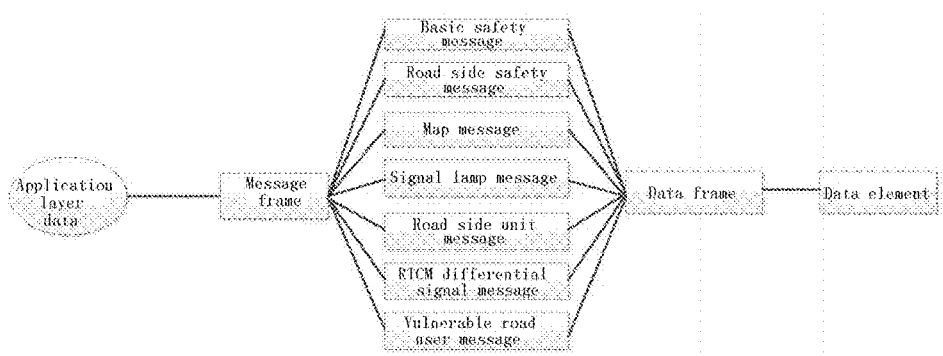
FIG. 3 is a schematic diagram showing a structure of a message according to an embodiment of the present disclosure.

FIG. 3 is a schematic diagram showing a structure of a message according to an embodiment of the present disclosure. As shown in FIG. 3, a message sublayer of application layer data includes a message frame including but not limited to the basic safety message, the road side safety message, the map message, the signal lamp message, the road side unit message, the RTCM differential signal message and the VRU message. The message frame includes a data frame, and the data frame is composed of data elements.

For each of the above messages, the pseudo codes of the message represents content of the message frame of the message, and the data frame is described below. Here, the data frame may include the effective time of the message, the effective range of the message, the service type, the object type, the priority of the message, and the data information of the vulnerable road user.

Pseudo codes of the effective time of the message according to the present disclosure are as follows. The effective time may include a month of the start time, a date of the start time, an hour of the start time, a minute of the start time, a second of the start time, a month of the end time, a date of the end time, an hour of the end time, a minute of the end time, and a second of the end time.

Valid_Time_Period::=SEQUENCE {
startmonth DMonth,
startday DDay,
starthour DHour,
startminute DMinute,
startsecond DSecond,
endmonth DMonth,
endday DDay,
endhour DHour,
endminute DMinute,
endsecond DSecond
}

In the above codes, startmonth DMonth represents the month of the start time. startday DDay represents the date of the start time. starthour DHour represents the hour of the start time. startminute DMinute represents the minute of the start time. startsecond DSecond represents the second of the start time. endmonth DMonth represents the month of the end time. endday DDay represents the date of the end time. endhour DHour represents the hour of the end time. endminute DMinute represents the minute of the end time. endsecond DSecond represents the second of the end time.

Pseudo codes of the effective range according to the present disclosure are as follows. The effective range may include coordinates of the message source and an effective radius of the message.

```
Valid_Coverage_Area ::= SEQUENCE {
    pos Position3D,
    covRadius CoverageRadius
}
```

In the above codes, pos Position3D represents the coordinates of the message source. covRadius CoverageRadius represents the effective radius of the message.

Pseudo codes of the service type according to the present disclosure are as follows.

```
Service ::= SEQUENCE {
    svType ServiceType,
    svID ServiceID
}
```

In the above codes, svType ServiceType represents the service type and svID ServiceID a serial number of the service type.

Pseudo codes of the object type according to the present disclosure are as follows.

```
Object ::= SEQUENCE {
    obType ObjectType,
    obID ObjectID
}
```

In the above codes, obType ObjectType represents the object type and obID ObjectID represents a serial number of the object type.

Pseudo codes of the priority of the message according to the present disclosure are as follows.

```
Message_Priority ::= SEQUENCE {
    priority Priority,
}
```

In the above codes, priority Priority represents the priority of the message.

Pseudo codes of the data information of the vulnerable road user according to the present disclosure are as follows. The data information of the vulnerable road user may include a type of the vulnerable road user, a speed of the vulnerable road user and the state information of the vulnerable road user.

```
ParticipantData ::= SEQUENCE {
    ptcType ParticipantType,
    ptcSpeed ParticipantSpeed,
    ptcSI ParticipantStateInformation
}
```

In the above codes, ptcType ParticipantType represents the type of the vulnerable road user. ptcSpeed ParticipantSpeed represents the speed of the vulnerable road user. ptcSI ParticipantStateInformation represents the state information of the vulnerable road user, that is, the physiological parameter information.

Content of each data frame is described above, and content of each data element is described below.

DE_DMonth
    DMonth::=INTEGER (1 . . . 12)
DE DDay
    DDay::=INTEGER (1 . . . 31)
DE DHour
    DHour::=INTEGER (0 . . . 23)
DE DMinute
    DMinute::=INTEGER (0 . . . 59)
DE DSecond
    DSecond::=INTEGER (0 . . . 59)

Contents of data elements in month, day, hour, minute and second are described above. The data elements are integers. The month ranges from 1 to 12. The day ranges from 1 to 31. The hour ranges from 0 to 23. The minute ranges from 0 to 59. The second ranges from 0 to 59.

CoverageRadius::=INTEGER (0 . . . 65535)

Content of the data element of the effective radius is described above. The data element is an integer and ranges from 0 to 65535.

```
ServiceType ::= ENUMERATED {
    vehicle merging (0),
    group charing (1),
    intelligent parking (2),
    dynamical grouping for map update and path planning (3)
    ...
}
```

Content of the data element of the service type is described above. Vehicle merging represents that vehicles merge. group charging represents that a vehicle group passes through a toll station. intelligent parking represents that intelligent parking of a vehicle. dynamic grouping for map update and path planning represents dynamic grouping of vehicles based on map update and path planning.

ServiceID::=INTEGER (0 . . . 65535)

Content of the data element of the service serial number is described above. The data element is an integer and ranges from 0 to 65535.

```
ObjectType ::= ENUMERATED {
    vehicle fleet (0),
    rsu (1),
    vru (vulnerable road users) (2)
    ...
}
```

Content of the data element of the object type is described above. vehicle fleet represents a fleet. rsu represents RSU. vru (vulnerable road users) represents the vulnerable road user.

ObjectID::=INTEGER (0 . . . 65535)

Content of the data element of the object serial number is described above. The data element is an integer and ranges from 0 to 65535.

Priority::=INTEGER(0 . . . 65535)

Content of the data element of the priority of the message is described above. The data element is an integer and ranges from 0 to 65535.

```
ParticipantType ::= ENUMERATED {
    motorcyclist (0),
    elderly person (1),
    disabled person (2),
    child (3)
    ...
}
```

Content of the data element of the vulnerable road user is described above. motorcyclist represents a person riding a motorcycle. elderly person represents the elderly. disabled person represents the disabled. child represents a child.

ParticipantSpeed::=INTEGER (0 . . . 65535)

Content of the data element of the speed of the vulnerable road user is described above. The data element is an integer and ranges from 0 to 65535.

ParticipantStateInformation::=BIT STRING {
  height (0),
  age (1),
  gender (2)
  blood pressure(3),
  body temperature (4),
  heart rate (5),
  expression (6)
} (SIZE (7, . . . ))

Content of the data elements of the state information (physiological parameters) of the vulnerable road user is described above. height represents the height of the vulnerable road user. age represents the age of the vulnerable road user. gender represents the gender of the vulnerable road user. blood pressure represents the blood pressure of the vulnerable road user. body temperature represents the body temperature of the vulnerable road user. heart rate represents heart rate of the vulnerable road user. expression represents the expression of the vulnerable road user.

The electronic apparatus 100 is described in detail above by taking the electronic apparatus 100 used in a vehicle as an example. In practice, the electronic apparatus 100 may be used in devices such as an RSU. In a case that the electronic apparatus 100 is arranged in the RSU, the electronic apparatus 100 receives a message including an effective time and an effective range from the vehicle. That is, the electronic apparatus 100 is used in a device that is configured to receive a message including an effective time and an effective range. The device receiving the message may be a vehicle or an RSU.

It can be seen that since the message includes the effective time and the effective range of the message, the electronic apparatus 100 according to the embodiment of the present disclosure determines whether to forward the message. That is, the electronic apparatus 100 may forward only part of the message to minimize overhead and time delay, thereby improving communication efficiency. Further, the VRU message is provided according to the present disclosure, so that the vulnerable road user directly communicates with the vehicle, which reduces the delay of information. In addition, the message frame, the data frame and the message structure of the data element are defined in the application layer according to the disclosure, standardizing the design of the message in the application layer and realizing efficient communication.

2. Configuration Example of Electronic Apparatus for Road Side Unit

Figure 4:
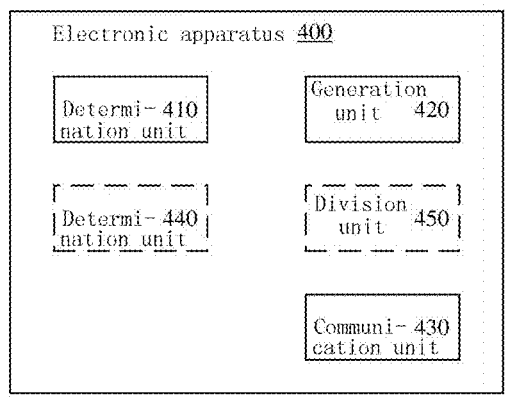
FIG. 4 is a block diagram showing an example of configuration of an electronic apparatus for a road side unit according to an embodiment of the present disclosure.

FIG. 4 is a block diagram showing a structure of an electronic apparatus 400 for a road side unit in the wireless communication system according to an embodiment of the present disclosure. As shown in FIG. 4, the electronic apparatus 400 includes determination unit 410, a generation unit 420, and a communication unit 430.

Here, units of the electronic apparatus 400 may be included in a processing circuit. It should be noted that the electronic apparatus 400 may include one processing circuitry or multiple processing circuitry. Further, the processing circuitry may include various separate functional units to perform various functions and/or operations. It should be noted that these functional units may be physical entities or logical entities, and units with different names may be implemented by one physical entity.

According to an embodiment of the present disclosure, the determination unit 410 is configured to determine an effective time of a message and an effective range of the message.

According to an embodiment of the present disclosure, the electronic apparatus 400, for example, determines the effective range of the message according to a service range of the electronic apparatus 400, because outside the service range of the electronic apparatus 400, it is unlikely that a vehicle receiving the message refers to the message. Further, the electronic apparatus 400 determines the effective time of the message according to a period in which the electronic apparatus 400 updates the message. For example, in a case that the electronic apparatus 400 updates a map message at a certain period, a map message not within a certain time range is not the latest map message, so that the map message should not be forwarded.

According to an embodiment of the present disclosure, the generation unit 420 is configured to generate a message including an effective time of the message and an effective range of the message.

According to an embodiment of the present disclosure, the electronic apparatus 400 sends a message to a vehicle through the communication unit 430 for the vehicle to determine whether to forward the message according to the effective time of the message and the effective range of the message.

According to an embodiment of the present disclosure, the generation unit 420 may cause the generated message to include a start time of the message and an end time of the message in the message. In addition, the generation unit 420 may further cause the generated message to include a position of a message source and an effective radius of the message in the message.

According to an embodiment of the present disclosure, as shown in FIG. 4, the electronic apparatus 400 may further include a determination unit 440 configured to determine priority of the message. The priority indicates an order of forwarding the message. Here, the determination unit 440 may determine the priority of the message according to importance of the message, so that an important message has high priority. For example, priority of a traffic event message is higher than priority of a map message.

According to an embodiment of the present disclosure, the generation unit 420 causes the message to include the priority of the message when generating the message.

According to an embodiment of the present disclosure, the generation unit 420 causes the message to include service type information and/or object type information when generating the message.

According to an embodiment of the present disclosure, the message generated by the electronic apparatus 400 includes, but is not limited to: a map message, a road side unit message, a road side safety message, and a signal lamp message.

The electronic apparatus 400 is described in detail above by taking the electronic apparatus 400 used in an RSU as an example. In practice, the electronic apparatus 400 may also be used in a vehicle. For example, the electronic apparatus 400 arranged in a vehicle generates and sends a BSM message. That is, the electronic apparatus 400 may be used in a device that generates and transmits a message including an effective time and an effective range, and the device may be a vehicle or an RSU.

As described above, according to the embodiments of the present disclosure, when generating the message, the electronic apparatus 400 causes the effective time and the effective range of the message to be included in the message, so that the vehicle forwards only part of the message, so as to minimize the overhead and time delay, thereby improving the communication efficiency.

According to an embodiment of the present disclosure, as shown in FIG. 4, the electronic apparatus 400 may further include a division unit 450 configured to divide multiple vehicles into one or more groups according to destinations of the multiple vehicles, so that vehicles in the same group have the same destination.

Here, the electronic apparatus 400 may receive destination information of each vehicle from the vehicle through the communication unit 430, so as to divide vehicles with the same destination into the same group. Further, the electronic apparatus 400 may send an identification of a group to which each vehicle belongs to the vehicle through the communication unit 430.

According to an embodiment of the present disclosure, the electronic apparatus 400 may receive a map request message for requesting a map message from a vehicle through the communication unit 430.

According to an embodiment of the present disclosure, the determination unit 410 determines a map message of a group to which the vehicle belongs.

According to an embodiment of the present disclosure, the electronic apparatus 400 sends to the vehicle the map message of the group to which the vehicle belongs to through the communication unit 430. Here, the electronic apparatus 400 may send the map message for the group in a form of broadcast.

As described above, the electronic apparatus 400 according to the embodiment of the present disclosure may divide vehicles according to destination information, so as to send messages such as map messages to different groups, thereby reducing the amount of interactive information. It is worth noted that, an embodiment in which the electronic apparatus 400 sends messages to groups is described by taking the map message as an example. The electronic apparatus 400 may further send the road side unit message, the road side safety message, the signal lamp message and other message to the groups in a similar manner.

3. Method Embodiment

Next, a wireless communication method performed by the electronic apparatus 100 for a vehicle in a wireless communication system according to an embodiment of the present disclosure is described in detail.

Figure 5:
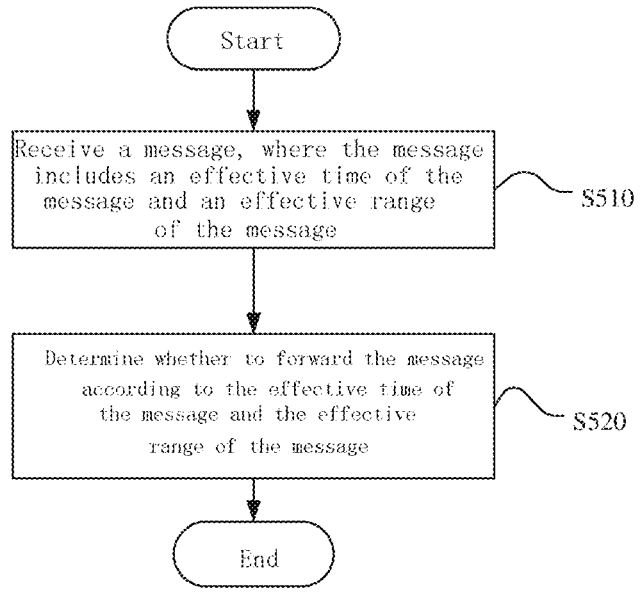
FIG. 5 is a flowchart of a wireless communication method performed by an electronic apparatus for a vehicle according to an embodiment of the present disclosure.

FIG. 5 is a flowchart of the wireless communication method performed by the electronic apparatus 100 for a vehicle in a wireless communication system according to an embodiment of the present disclosure.

As shown in FIG. 5, in step S510, a message is received. The message includes an effective time of the message and an effective range of the message.

Next, in step S520, whether to forward the message is determined according to the effective time of the message and the effective range of the message.

Preferably, whether to forward the message is determined by: determining whether a current time is within the effective time of the message; determining whether a position of the electronic apparatus 100 is within the effective range of the message; and forwarding the message in a case that the current time is within the effective time of the message and the position of the electronic apparatus 100 is within the effective range of the message.

Preferably, whether to forward the message is determined by: discarding the message in a case that the current time is not within the effective time of the message or the position of the electronic apparatus 100 is not within the effective range of the message.

Preferably, the effective time of the message includes a start time of the message and an end time of the message.

Preferably, the effective range of the message includes a position of a message source and an effective radius of the message.

Preferably, the message further includes priority of the message, and the wireless communication method further includes determining an order of forwarding the message according to the priority of the message.

Preferably, the message includes: a basic safety message, a map message, a road side unit message, a road side safety message, a Radio Technical Commission for maritime services differential signal message or a signal lamp message.

Preferably, the message is received by: receiving the message from a road side unit, other vehicle or a network side device.

Preferably, the wireless communication method further includes receiving the message from a vulnerable road user, the message including physiological parameters of the vulnerable road user; and determining a driving strategy of the vehicle according to the physiological parameters of vulnerable road user.

According to the embodiment of the present disclosure, the method described above is performed by the electronic apparatus 100 according to the embodiment of the present disclosure. Therefore, all the previous embodiments of the electronic apparatus 100 are applicable to the method.

Next, a wireless communication method performed by the electronic apparatus 400 for a road side unit in a wireless communication system according to an embodiment of the present disclosure is described in detail.

Figure 6:
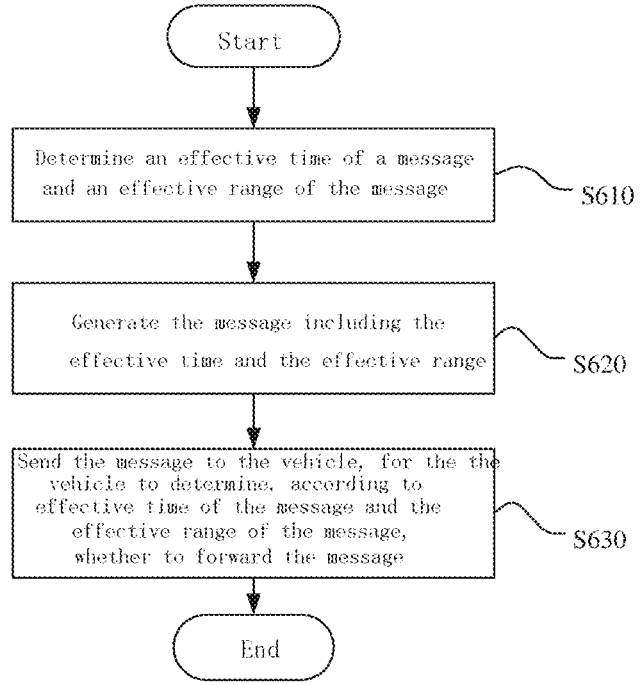
FIG. 6 is a flowchart of a wireless communication method performed by an electronic apparatus for a road side unit according to an embodiment of the present disclosure.

FIG. 6 is a flowchart of the wireless communication method performed by the electronic apparatus 400 for a road side unit in a wireless communication system according to an embodiment of the present disclosure.

As shown in FIG. 6, in step S610, an effective time of a message and an effective range of the message are determined.

Next, in step S620, the message including the effective time and the effective range is generated.

Next, in step S630, the message is sent to the vehicle, for the vehicle to determine, according to the effective time of the message and the effective range of the message, whether to forward the message.

Preferably, the effective time of the message includes a start time of the message and an end time of the message.

Preferably, the effective range of the message includes a position of a message source and an effective radius of the message.

Preferably, the wireless communication method further includes determining a priority of the message. The priority indicates an order of forwarding the massage. The message further includes the priority of the message.

Preferably, the message includes: a map message, a road side unit message, a road side safety message, or a signal lamp message.

According to the embodiment of the present disclosure, the method described above is performed by the electronic apparatus 400 according to the embodiment of the present disclosure. Therefore, all the previous embodiments of the electronic apparatus 400 are applicable to the method.

Next, a wireless communication method performed by the electronic apparatus 400 for a road side unit in a wireless communication system according to another embodiment of the present disclosure is described in detail.

Figure 7:
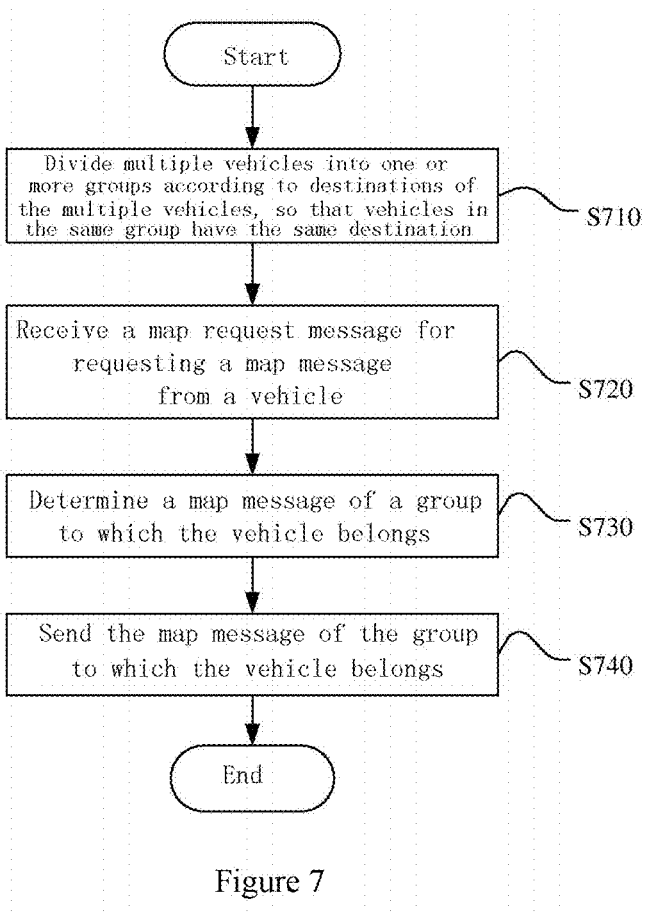
FIG. 7 is a flowchart of a wireless communication method performed by an electronic apparatus for a road side unit according to another embodiment of the present disclosure.

FIG. 7 is a flowchart of the wireless communication method performed by the electronic apparatus 400 for a road side unit in a wireless communication system according to another embodiment of the present disclosure.

As shown in FIG. 7, in step S710, multiple vehicles are divided into one or more groups according to destinations of the multiple vehicles, so that vehicles in the same group have the same destination.

Next, in step S720, a map request message for requesting a map message is received from a vehicle.

Next, in step S730, a map message of a group to which the vehicle belongs is determined.

Next, in step S740, the map message of the group to which the vehicle belongs is sent.

According to the embodiment of the present disclosure, the method described above is performed by the electronic apparatus 400 according to the embodiment of the present disclosure. Therefore, all the previous embodiments of the electronic apparatus 400 are applicable to the method.

4. Application Example

The present disclosure is applicable to various scenarios. The embodiments of the present disclosure are described below by taking several typical scenarios as examples. It is worth noted that the embodiments of the present disclosure are not limited to the following scenarios.

Figure 8:
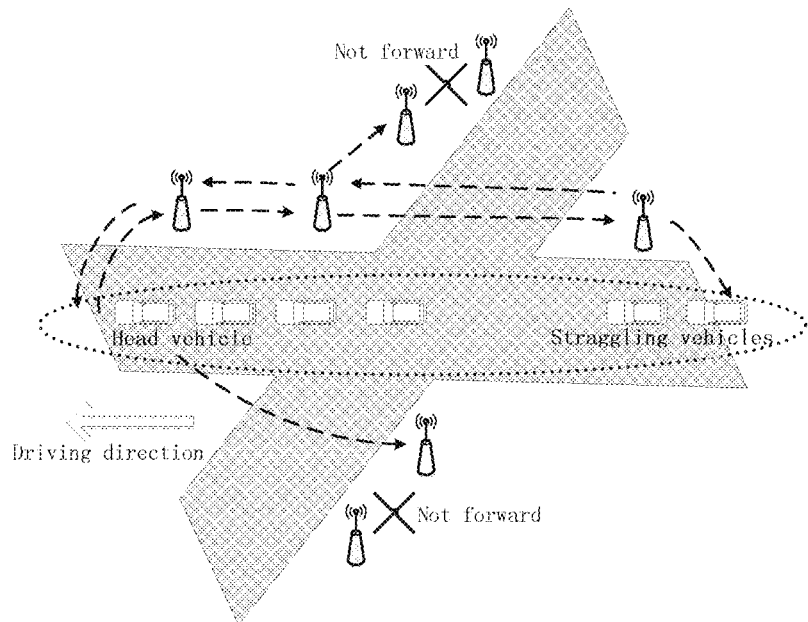
FIG. 8 is a schematic diagram showing a scenario of searching for a straggling vehicle according to an embodiment of the present disclosure.

FIG. 8 is a schematic diagram showing a scenario of searching for a straggling vehicle according to an embodiment of the present disclosure. As shown in FIG. 8, an oval area formed by a dotted line shows a fleet including six vehicles. The fleet drives toward a left direction in FIG. 8. A foremost vehicle in the driving direction is a head vehicle, and other vehicles are member vehicles of the fleet. Here, two vehicles lost communication with the head vehicle and are referred to as straggling vehicles. In addition, FIG. 8 shows an example of some RSUs arranged near intersections. Here, the head vehicle may be provided with the electronic apparatus 400 described above, and the RSU may be provided with the electronic apparatus 100 described above.

According to the embodiment of the present disclosure, when the head vehicle of the fleet finds that there are straggling vehicles, the head vehicle generates and sends a message. The message, for example, includes an effective time of the message and an effective range of the message. The message may further include identification information (a group ID) of the fleet or identification information of the straggling vehicles. Here, the head vehicle may send the message in a form of broadcasting. According to the embodiment of the present disclosure, the head vehicle determines the effective time and the effective range of the message according to a time and a place before the straggling vehicles loss communication with the head vehicle, so as to reduce a search range. Next, an RSU receiving the message from the head vehicle determines whether to forward the message according to the effective time and the effective range included in the message. Next, when receiving the message from an RSU, the straggling vehicle determines that the head vehicle is searching for the straggling vehicle according to the identification information of the fleet or the identification information of the straggling vehicle that are included in the message. The straggling vehicle sends position information of the straggling vehicle. Through the forwarding of the RSU, the head vehicle acquires position information of the straggling vehicle, so as to find the straggling vehicle.

Dashed arrows in FIG. 8 indicate a transmission direction of the message. As shown in FIG. 8, after the head vehicle sends the message, by setting the effective time and the effective range of the message, RSUs on the driving route of the fleet forwards the message, while RSUs not on the driving route does not forward the message.

According to the embodiment of the present disclosure, during the driving of the fleet, the head vehicle may send information including the identification (the group ID) of the fleet in a form of broadcast, so that the RSUs on the driving route of the fleet receive and save the identification information of the fleet. In this case, when the head vehicle searches for the straggling vehicles, the message sent by the head vehicle may include the identification information of the fleet. An RSU receiving the message from the head vehicle may determines whether to forward the message according to the effective time and effective range included in the message and whether the identification information of the fleet is stored. That is, in a case that a current time is within the effective time, a position of the RSU is within the effective range, and the RSU stores the identification information of the fleet, the RSU forwards the message. Thus, the number and overhead of message to be sent is further reduced.

Figure 9:
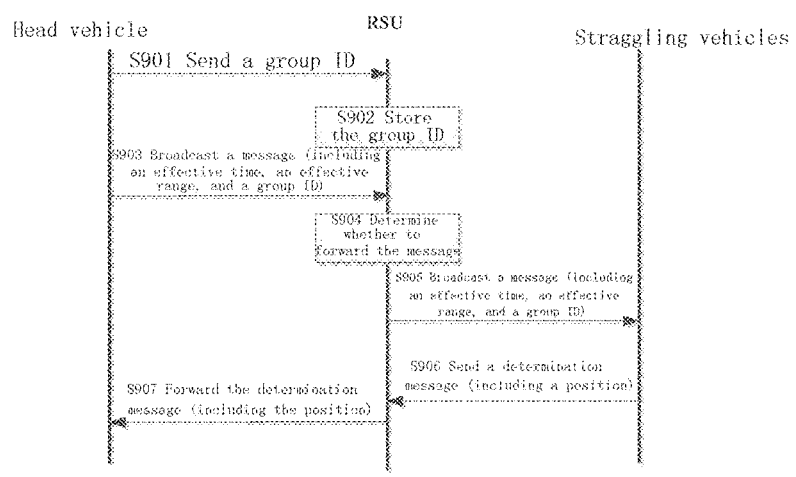
FIG. 9 is a signaling flowchart showing searching for a straggling vehicle according to an embodiment of the present disclosure.

FIG. 9 is a signaling flowchart showing searching for a straggling vehicle according to an embodiment of the present disclosure. As shown in FIG. 9, in step S901, the head vehicle sends information including the group ID of the fleet in a form of broadcast during driving. In step S902, the RSU that receives the group ID of the fleet stores the group ID. When the head vehicle finds that there is a straggling vehicle, in step S903, the head vehicle sends a message in a form of broadcast, the message including the effective time and the effective range of the message and the group ID. In step S904, the RSU receiving the message determines whether to forward the message according to the effective time, the effective range and the group ID. In a case that the RSU determines not to forward the message, the RSU discards the message. In a case that the RSU determines to forward the message, the RSU forwards the message in step S905. Thus, through the forwarding of one or more RSUs, the straggling vehicle receives the message and determines that the head vehicle is searching for the straggling vehicle according to the group ID in the message. Next, in step S906, the straggling vehicle sends a determination message including position information. In step S907, through the forwarding of the RSU, the head vehicle receives the determination message of the straggling vehicle, so as to find the straggling vehicle.

As described above, according to the embodiment of the present disclosure, the effective time and the effective range are set in the message, which shrink a search range, reduces the number of messages required to be interacted, and thus the head vehicle find the straggling vehicle quickly.

Figure 10:
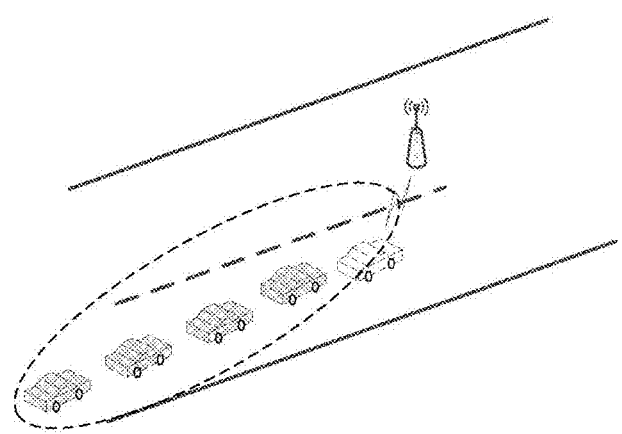
FIG. 10 is a schematic diagram showing a scenario in which a head vehicle of a fleet passes a toll station according to an embodiment of the present disclosure.

FIG. 10 is a schematic diagram showing a scenario in which a head vehicle of a fleet passes a toll station according to an embodiment of the present disclosure. As shown in FIG. 10, an oval area formed by dotted lines shows a fleet including five vehicles driving towards an upper right direction in FIG. 10. A foremost vehicle in the driving direction is referred to as the head vehicle, and other vehicles are referred to as member vehicles of the fleet. The RSU in FIG. 10 may be arranged for example, in the toll station. As shown in FIG. 10, when the fleet passes through the toll station, the head vehicle passes the toll station first. According to the embodiment of the present disclosure, a process of the fleet passing through the toll station can be simplified through interaction between the head vehicle and the RSU in the toll station.

Figure 12:
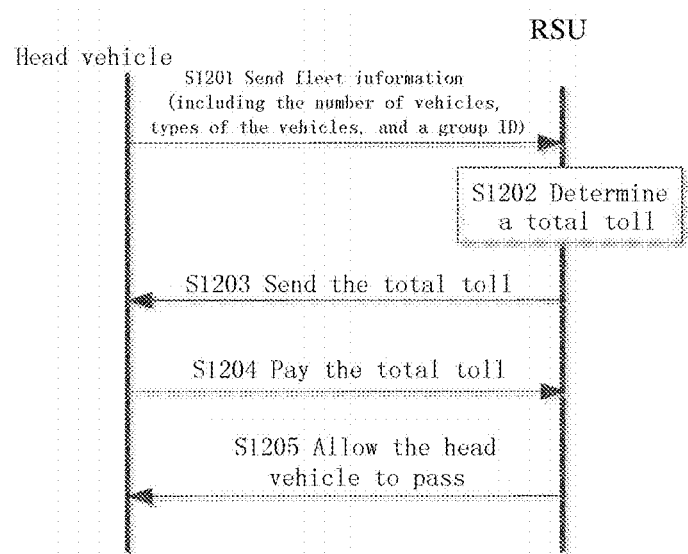
FIG. 12 is a signaling flowchart showing the head vehicle of the fleet passing the toll station according to an embodiment of the present disclosure.

FIG. 12 is a signaling flowchart showing the head vehicle of the fleet passing the toll station according to an embodiment of the present disclosure. As shown in FIG. 12, in step S1201, the head vehicle may send fleet information to the RSU. The fleet information may include the number of vehicles in the fleet, types of the vehicles (a truck, a bus, a sedan and the like) and the identification information (a group ID) of the fleet. Next, in step S1202, the RSU determines a total toll of the fleet according to the types of the vehicles in the fleet. Next, in step S1203, the RSU sends the total toll of the fleet to the head vehicle. Next, in step S1204, the head vehicle pays the total toll of the fleet to the RSU. Next, in step S1205, the RSU determines that the payment is successful and allows the head vehicle to pass the toll station.

Figure 11:
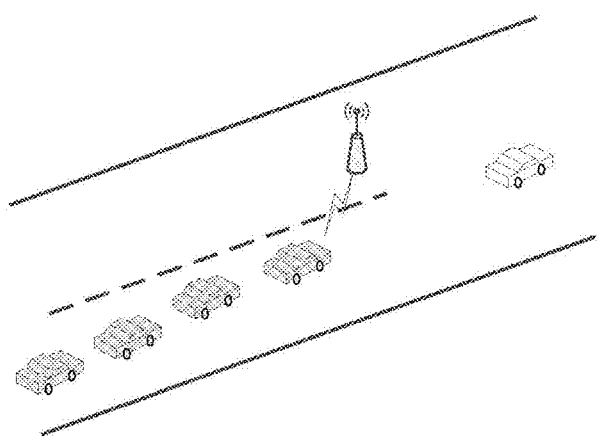
FIG. 11 is a schematic diagram showing a scenario in which member vehicles of the fleet pass the toll station according to an embodiment of the present disclosure.

FIG. 11 is a schematic diagram showing a scenario in which member vehicles of the fleet pass the toll station according to an embodiment of the present disclosure. As shown in FIG. 11, after the head vehicle pays the total toll of the fleet and passes through the toll station, the member vehicles pass through the toll station sequentially. According to the embodiment of the present disclosure, the member vehicles can quickly pass through the toll station by simply interacting with the RSU in the toll station.

Figure 13:
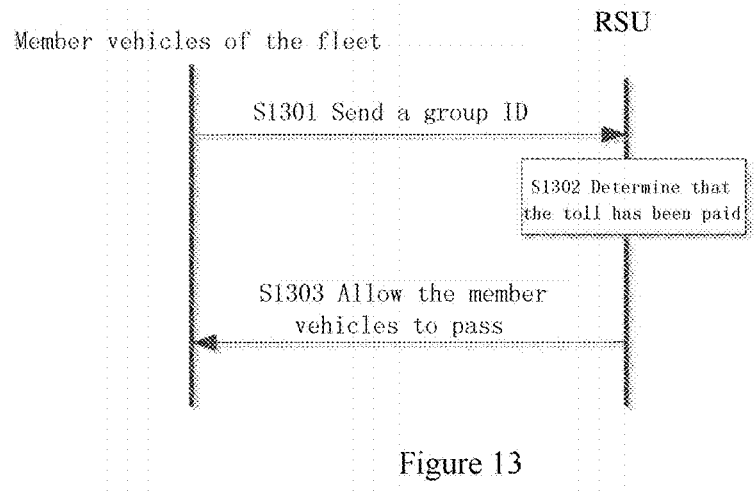
FIG. 13 is a signaling flowchart showing the member vehicles of the fleet passing the toll station according to an embodiment of the present disclosure.

FIG. 13 is a signaling flowchart showing the member vehicles of the fleet passing the toll station according to an embodiment of the present disclosure. As shown in FIG. 13, in step S1301, the member vehicles sends information including the identification information (the group ID) of the fleet to the RSU. Next, in step S1302, the RSU determines that the toll of all vehicles of the fleet has been paid. Next, in step S1303, the RSU allows the member vehicles to pass the toll station.

As described above, according to the embodiment of the present disclosure, through the information interaction between the head vehicle and the RSU in the toll station, the head vehicle pays the passage fees of all vehicles in the fleet at one time, so that the member vehicles directly pass through the toll station. Thus, the information interaction between the member vehicles and the toll station is reduced, and the fleet passes through the toll station quickly.

Figure 14:
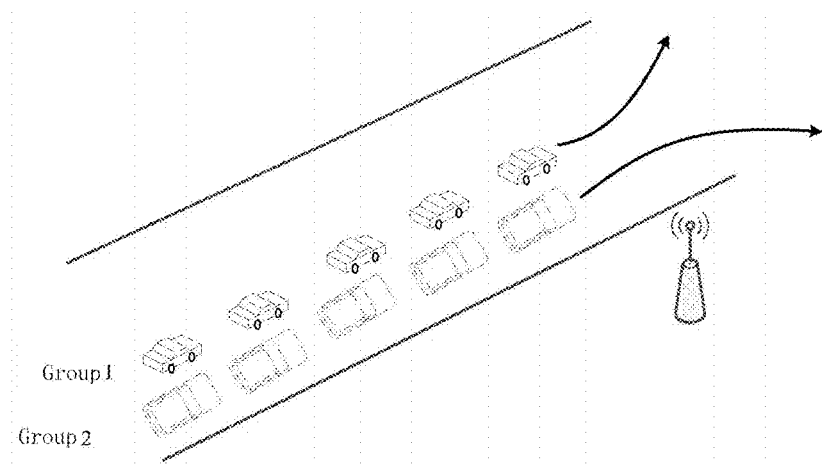
FIG. 14 is a schematic diagram showing a scenario of dividing vehicles into groups according to an embodiment of the present disclosure.

FIG. 14 is a schematic diagram showing a scenario of dividing vehicles into groups according to an embodiment of the present disclosure. As shown in FIG. 14, there are ten vehicles on the road. A destination of five of the ten vehicles is on the left side of the road and a destination of the other five vehicles is on the right side of the road. According to the embodiment of the present disclosure, the ten vehicles may be divided into groups through information interaction with an RSU near the road, thereby reducing the number of messages to be sent. The RSU may include the electronic apparatus 400 described above.

Figure 15:
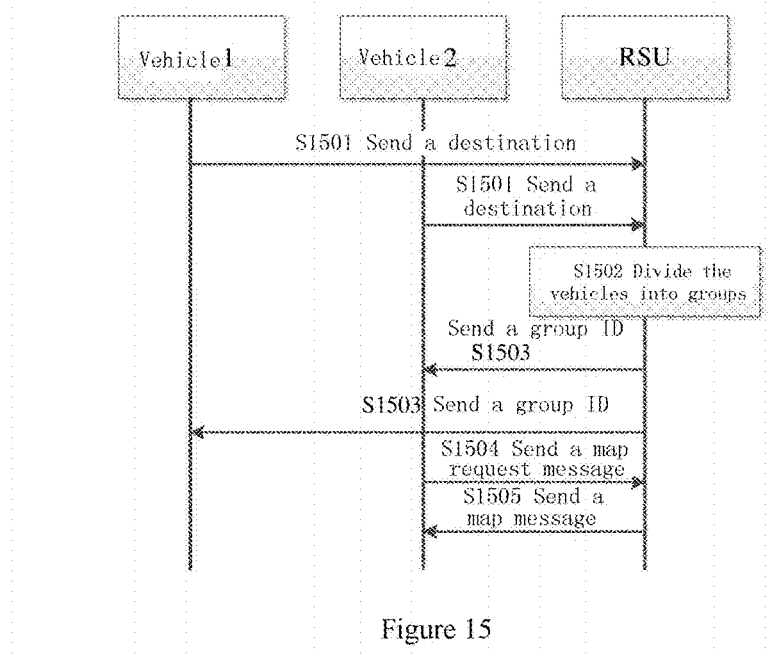
FIG. 15 is a signaling flowchart showing dividing vehicles into groups according to an embodiment of the present disclosure.

FIG. 15 is a signaling flowchart showing dividing vehicles into groups according to an embodiment of the present disclosure. In step S1501, each of the vehicles sends destination information of the vehicle to the RSU. Next, in step S1502, the electronic apparatus 400 in the RSU may divide the vehicles into groups according to destinations of the vehicles, so that vehicles having the same destination are divided into the same group. Next, in step S1503, the RSU send identification information (a group ID) of each group in a form of broadcast, so that each vehicle knows a group to which the vehicle belongs. Next, in step S1504, the vehicle 2 sends a map request message to the RSU. Next, in step S1505, the RSU sends a map message of the group to which the vehicle 2 belongs in a form of broadcast. The map message includes identification information of the group to which the vehicle 2 belongs. Thus, the vehicle 2 receives and saves the map message according to the group ID included in the map message.

As described above, according to the embodiment of the present disclosure, the RSU divides multiple vehicles into one or more groups according to destinations of the vehicles, so as to send a message such as a map message in a unit of group, reducing the number of messages to be sent.

Figure 16:
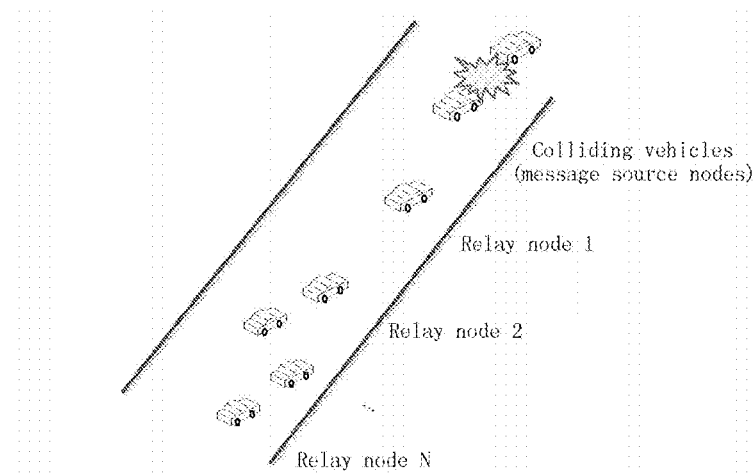
FIG. 16 is a schematic diagram showing a scenario of diffusing road condition information according to an embodiment of the present disclosure.

FIG. 16 is a schematic diagram showing a scenario of diffusing road condition information according to an embodiment of the present disclosure. As shown in FIG. 16, a traffic accident occurs on the road. Two colliding vehicles are referred to as message source nodes, and other vehicles on the road are referred to as relay nodes. FIG. 16 shows a relay node 1, a relay node 2, . . . and a relay node N. Here, the vehicle serving as the message source node may include the electronic apparatus 400 described above, and the vehicle serving as the relay node may include the electronic apparatus 100 described above.

Figure 17:
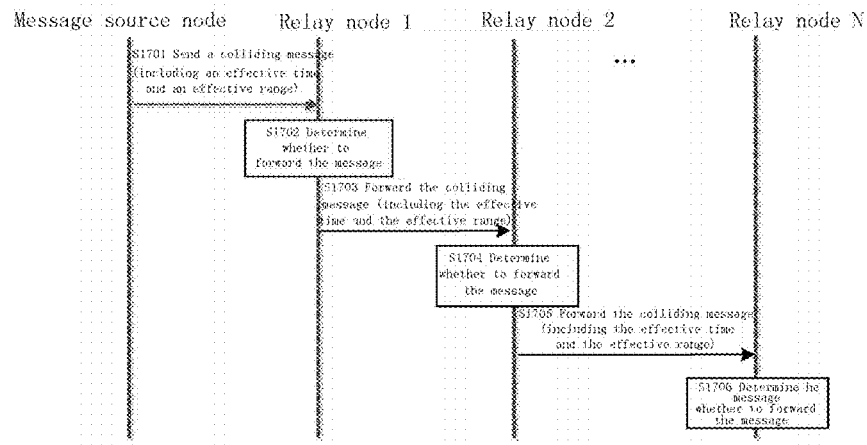
FIG. 17 is a signaling flowchart showing diffusing road condition information according to an embodiment of the present disclosure.

FIG. 17 is a signaling flowchart showing diffusing road condition information according to an embodiment of the present disclosure. As shown in FIG. 17, in step S1701, the message source node generates and sends a collision message. The collision message includes an effective time and an effective range of the message. Next, in step S1702, the relay node 1 receiving the collision message determines whether to forward the message according to the effective time and effective range included in the message. Here, it is assumed that the relay node 1 determines to forward the message. In step S1703, the relay node 1 forwards the collision message. In step S1704, the relay node 2 receiving the collision message determines whether to forward the message according to the effective time and effective range included in the message. Here, it is assumed that the relay node 2 determines to forward the message. In step S1705, the relay node 2 forwards the collision message. Next, in step S1706, the relay node N receiving the collision message determines whether to forward the message according to the effective time and effective range included in the message. Here, it is assumed that the relay node N determines not to forward the message, and the relay node N discards the message.

As described above, according to the embodiment of the present disclosure, the effective time and the effective range are set in the message, so that the collision message is diffused only within the effective time and the effective range, which greatly reduces the amount of information required to be interacted between vehicles, thereby reducing the delay.

The electronic apparatus 100 according to the present disclosure may be implemented as an electronic apparatus for a vehicle, for example, a terminal apparatus placed in or integrated in a vehicle. The terminal apparatus may be implemented as a mobile terminal (such as a smartphone, a tablet personal computer (PC), a notebook PC, a portable game terminal, a portable/dongle mobile router and a digital camera) or a vehicle terminal (such as a vehicle navigation apparatus). In addition, the terminal apparatus may further be a wireless communication module (such as an integrated circuitry module including one wafer) mounted on each of the above terminal apparatuses.

Figure 18:
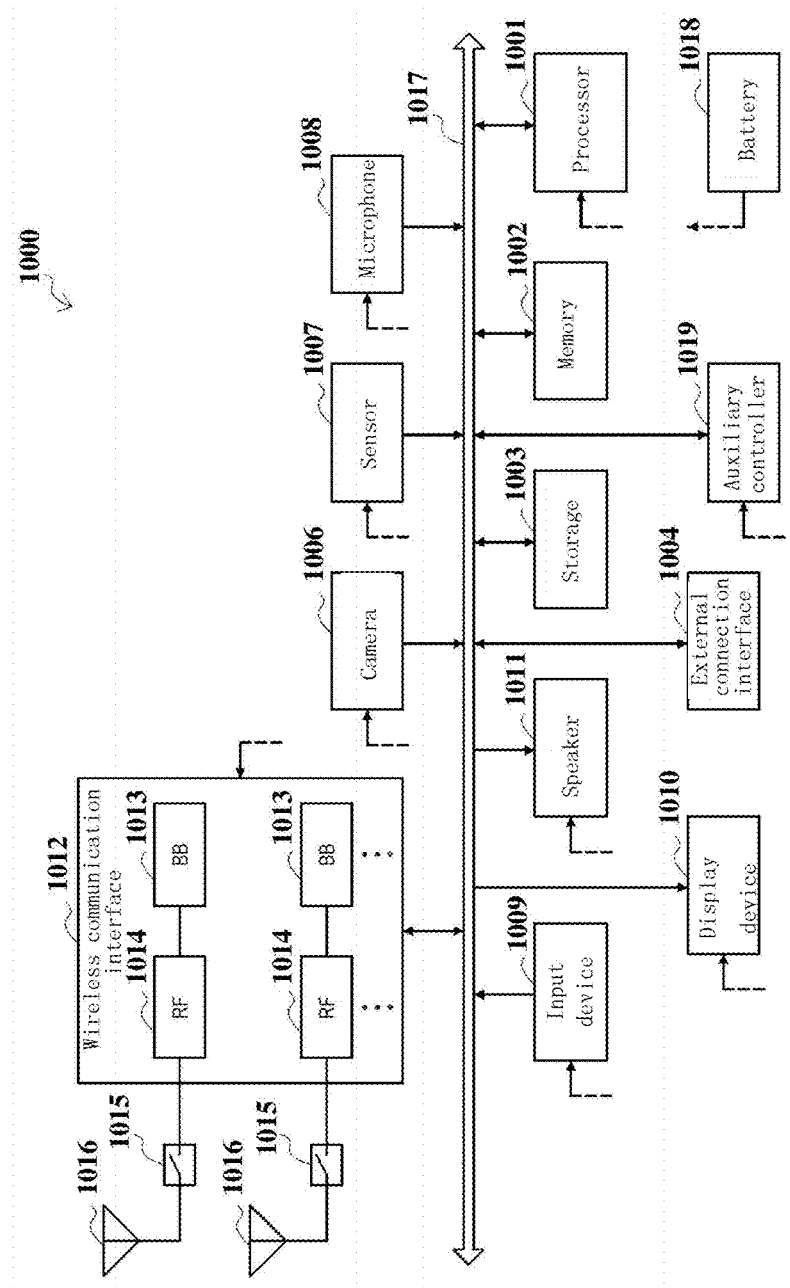
FIG. 18 is a block diagram showing an example of an exemplary configuration of a smartphone for a vehicle.

FIG. 18 is a block diagram showing an exemplary configuration of a smartphone 1000 to which technology according to the present disclosure may be applied. The smartphone 1000 includes a processor 1001, a memory 1002, a storage device 1003, an external connection interface 1004, a camera 1006, a sensor 1007, a microphone 1008, an input device 1009, a display device 1010, a loudspeaker 1011, a wireless communication interface 1012, one or more antenna switches 1015, one or more antennas 1016, a bus 1017, a battery 1018 and an auxiliary controller 1019.

The processor 1001 may be, for example, a CPU or a system on chip (SoC), and controls functions of an application layer and another layer of the smartphone 1000. The memory 1002 includes an RAM and an ROM, and stores data and a program executed by the processor 1001. The storage device 1003 may include a storage medium such as a semiconductor memory and a hard disk. The external connection interface 1004 is an interface for connecting an external device (such as a memory card and a universal serial bus (USB) device) to the smartphone 1000.

The camera 1006 includes an image sensor (such as a charge coupled device (CCD) and a complementary metal oxide semiconductor (CMOS)), and generates a captured image. The sensor 1007 may include a group of sensors such as a measurement sensor, a gyro sensor, a geomagnetic sensor, and an acceleration sensor. The microphone 1008 converts sound that is inputted to the smartphone 1000 into an audio signal. The input device 1009 includes, for example, a touch sensor configured to detect a touch on a screen of the display device 1010, a keypad, a keyboard, a button, or a switch, and receives an operation or information inputted from a user. The display device 1010 includes a screen (such as a liquid crystal display (LCD) and an organic light-emitting diode (OLED) display), and displays an output image of the smartphone 1000. The loudspeaker 1011 is configured to convert an audio signal outputted from the smartphone 1000 into sound.

The wireless communication interface 1012 supports any cellular communication scheme (such as LTE, LTE-Advanced and NR), and performs wireless communications. The wireless communication interface 1012 may include, for example, a BB processor 1013 and RF circuitry 1014. The BB processor 1013 may perform, for example, coding/decoding, modulating/demodulating and multiplexing/demultiplexing, and perform various types of signal processing for wireless communications. The RF circuitry 1014 may include, for example, a mixer, a filter and an amplifier, and sends and receives a wireless signal via an antenna 1016. The wireless communication interface 1012 may be a chip module having the BB processor 1013 and the RF circuitry 1014 integrated thereon. As shown in FIG. 18, the wireless communication interface 1012 may include multiple BB processors 1013 and multiple RF circuitry 1014. Although FIG. 18 shows an example in which the wireless communication interface 1012 includes the multiple BB processors 1013 and the multiple RF circuitry 1014, the wireless communication interface 1012 may include a single BB processor 1013 or single RF circuitry 1014.

Besides the cellular communication scheme, the wireless communication interface 1012 may support an additional type of wireless communication scheme, such as a short-distance wireless communication scheme, a near field communication scheme and a wireless local area network (LAN) scheme. In this case, the wireless communication interface 1012 may include the BB processor 1013 and the RF circuitry 1014 for each wireless communication scheme.

Each of the antenna switches 1015 switches a connection destination of the antenna 1016 among multiple circuitry (such as circuitry for different wireless communication schemes) included in the wireless communication interface 1012.

Each of the antennas 1016 includes a single antenna element or multiple antenna elements (such as multiple antenna elements included in an MIMO antenna), and is used for the wireless communication interface 1012 to send and receive a wireless signal. The smartphone 1000 may include multiple antennas 1016, as shown in FIG. 18. Although FIG. 18 shows an example in which the smartphone 1000 includes the multiple antennas 1016, the smartphone 1000 may also include a single antenna 1016.

In addition, the smartphone 1000 may include an antenna 1016 for each type of wireless communication scheme. In this case, the antenna switches 1015 may be omitted from the configuration of the smartphone 1000.

The processor 1001, the memory 1002, the storage device 1003, the external connection interface 1004, the camera 1006, the sensor 1007, the microphone 1008, the input device 1009, the display device 1010, the loudspeaker 1011, the wireless communication interface 1012, and the auxiliary controller 1019 are connected to each other via the bus 1017. The battery 1018 supplies power to blocks of the smartphone 1000 shown in FIG. 18 via feeders that are partially shown with dashed lines in the drawings. The auxiliary controller 1019, for example, operates a minimum necessary function of the smartphone 1000 in a sleep mode.

In the smartphone 1000 shown in FIG. 18, the decoding unit 120, the determination unit 130, and the determination unit 140 that are shown in FIG. 1 may be implemented by the processor 1001 or the auxiliary controller 1019. At least a part of functions may also be implemented by the processor 1001 or the auxiliary controller 1019. For example, the processor 1001 or the auxiliary controller 1019 may decode the message, determine whether to forward the message, and determine a driving strategy of the vehicle by executing instructions stored in the memory 1002 or the storage device 1003.

Figure 19:
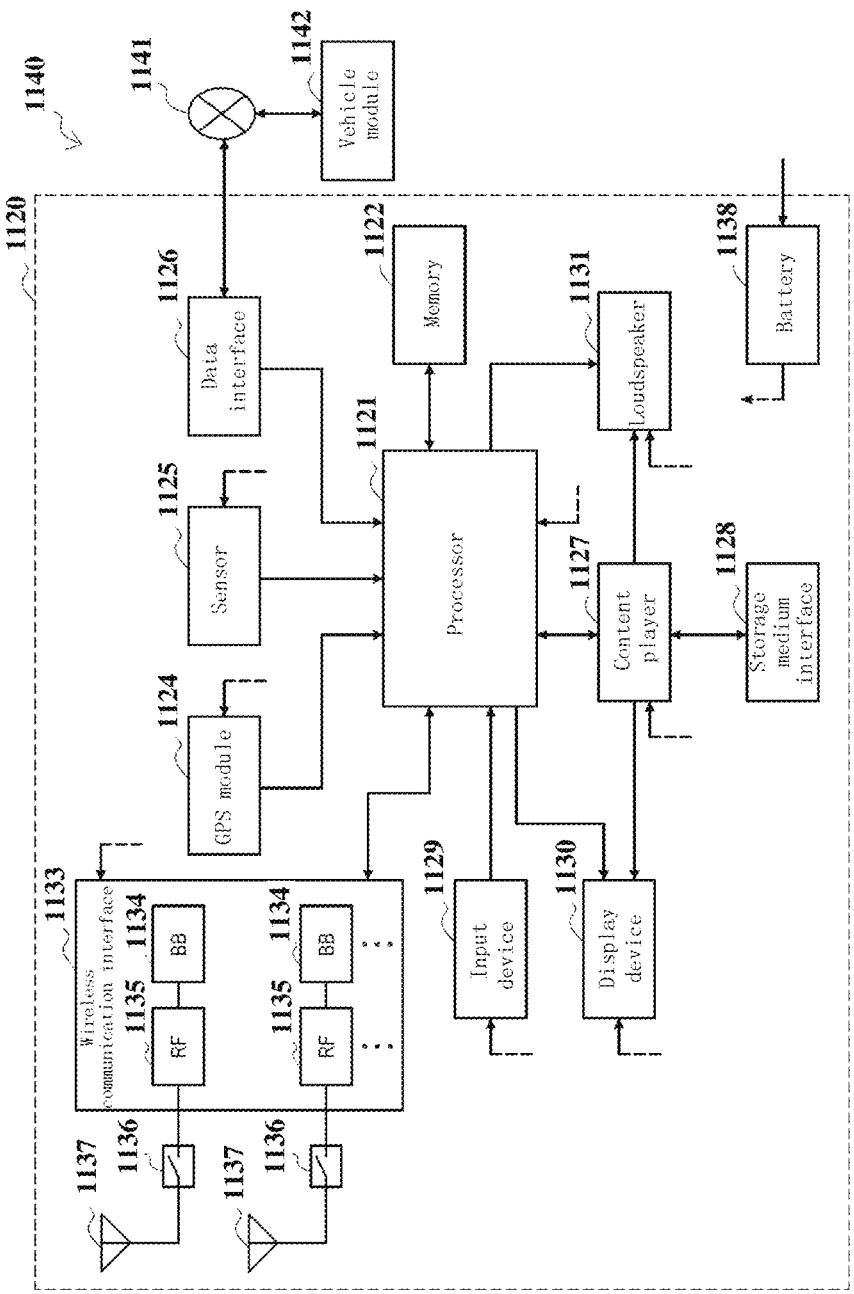
FIG. 19 is a block diagram showing an example of an exemplary configuration of a vehicle navigation apparatus.

FIG. 19 is a block diagram showing an example of schematic configuration of a vehicle navigation apparatus 1120 to which the technology according to the present disclosure may be applied. The vehicle navigation apparatus 1120 includes a processor 1121, a memory 1122, a global positioning system (GPS) module 1124, a sensor 1125, a data interface 1126, a content player 1127, a storage medium interface 1128, an input device 1129, a display device 1130, a loudspeaker 1131, a wireless communication interface 1133, one or more antenna switches 1136, one or more antennas 1137, and a battery 1138.

The processor 1121 may be, for example, a CPU or a SoC, and controls a navigation function and another function of the vehicle navigation apparatus 1120. The memory 1122 includes an RAM and an ROM, and stores a program executed by the processor 1121, and data.

The GPS module 1124 uses a GPS signal received from a GPS satellite to calculate a position (such as a latitude, a longitude, and an altitude) of the vehicle navigation apparatus 1120. The sensor 1125 may include a group of sensors such as a gyro sensor, a geomagnetic sensor, and an air pressure sensor. The data interface 1126 is connected to, for example, a vehicle network 1141 via a terminal that is not shown, and acquires data (such as vehicle speed data) generated by the vehicle.

The content player 1127 reproduces content stored in a storage medium (such as a CD and a DVD) that is inserted into the storage medium interface 1128. The input device 1129 includes, for example, a touch sensor configured to detect a touch on a screen of the display device 1130, a button, or a switch, and receives an operation or information inputted by a user. The display device 1130 includes a screen such as a LCD or an OLED display, and displays an image of the navigation function or reproduced content. The loudspeaker 1131 outputs sound of the navigation function or the reproduced content.

The wireless communication interface 1133 supports any cellular communication scheme (such as LTE and LTE-Advanced, and NR), and performs wireless communications. The wireless communication interface 1133 may generally include, for example, a BB processor 1134 and RF circuitry 1135. The BB processor 1134 may perform, for example, encoding/decoding, modulating/demodulating, and multiplexing/de-multiplexing, and performs various types of signal processing for wireless communications. In addition, the RF circuitry 1135 may include, for example, a mixer, a filter, and an amplifier, and sends and receives a wireless signal via the antenna 1137. The wireless communication interface 1133 may also be a chip module having the BB processor 1134 and the RF circuitry 1135 integrated thereon. The wireless communication interface 1133 may include multiple BB processors 1134 and multiple RF circuitry 1135, as shown in FIG. 19. Although FIG. 19 shows an example in which the wireless communication interface 1133 includes the multiple BB processors 1134 and the multiple RF circuitry 1135, the wireless communication interface 1133 may include a single BB processor 1134 or single RF circuitry 1135.

In addition to a cellular communication scheme, the wireless communication interface 1133 may support another type of wireless communication scheme such as a short-distance wireless communication scheme, a near field communication scheme, and a wireless LAN scheme. In that case, the wireless communication interface 1133 may include a BB processor 1134 and RF circuitry 1135 for each wireless communication scheme.

Each of the antenna switches 1136 switches a connection destination of the antenna 1137 among multiple circuitry (such as circuitry for different wireless communication schemes) included in the wireless communication interface 1133.

Each of the antennas 1137 includes a single short-distance wireless or multiple antenna elements (such as multiple antenna elements included in an MIMO antenna), and is used for the wireless communication interface 1133 to send and receive a wireless signal. The vehicle navigation apparatus 1120 may include multiple antennas 1137, as shown in FIG. 19. Although FIG. 19 shows an example in which the vehicle navigation apparatus 1120 includes the multiple antennas 1137, the vehicle navigation apparatus 1120 may include a single antenna 1137.

Furthermore, the vehicle navigation apparatus 1120 may include an antenna 1137 for each wireless communication scheme. In that case, the antenna switches 1136 may be omitted from the configuration of the vehicle navigation apparatus 1120.

The battery 1138 supplies power to blocks of the vehicle navigation apparatus 1120 shown in FIG. 19 via feeders that are partially shown as dashed lines in FIG. 19. The battery 1138 accumulates power supplied from the vehicle.

In the vehicle navigation apparatus 1120 shown in FIG. 19, the decoding unit 120, the determination unit 130, and the determination unit 140 that are shown in FIG. 1 may be implemented by the processor 1121. At least a part of functions may also be implemented by the processor 1121. For example, the processor 1121 may decode the message, determine whether to forward the message, and determine a driving strategy of the vehicle by executing instructions stored in the memory 1122.

The technology of the present disclosure may also be implemented as a vehicle system (or a vehicle) 1140 including one or more blocks in the vehicle navigation apparatus 1120, the vehicle network 1141, and a vehicle module 1142. The vehicle module 1142 generates vehicle data (such as a vehicle speed, an engine speed, and fault information), and outputs the generated data to the vehicle network 1141.

Preferred embodiments of the present disclosure are described above with reference to the drawings. However, the present disclosure is not limited to the above examples. Those skilled in the art may obtain various modifications and changes within the scope of the appended claims. It should understand that these modifications and changes fall within the technical scope of the present disclosure.

For example, a unit shown with a dashed-line block in functional block diagrams shown in the drawings is optional in a corresponding device. Further, optional functional units may be combined in a suitable manner to achieve required functions.

For example, in the above embodiments, multiple functions included in one unit may be achieved by separate devices. Alternately, in the above embodiments, multiple functions achieved by multiple units may be achieved by separate devices. In addition, one of the above functions may be achieved by multiple units. These configurations should be included in the technical scope of the present disclosure.

In this specification, the steps described in the flowcharts include not only processing performed in time series in the described order but also processing performed in parallel or individually instead of in time series. In addition, the steps performed in time series may be performed in a different order.

Although the embodiments of the present disclosure are described above in detail with reference to the drawings, it should be understood that the above-described embodiments are merely used for illustrating the present disclosure rather than intended to limit the present disclosure. Those skilled in the art can make various modifications and variations to the above-described embodiments without departing from the substance and scope of the present disclosure. Therefore, the scope of the present disclosure is defined only by the appended claims and their equivalents.

The invention claimed is:

1. An electronic apparatus for a vehicle, comprising processing circuitry configured to:
   receive a message comprising an effective time of the message and an effective range of the message; and
   determine, according to the effective time of the message and the effective range of the message, whether to forward the message,
   wherein the processing circuitry is configured to receive the message from a vulnerable road user, the vulnerable road user representing a traffic participant whose transportation means is not a vehicle, the message comprising physiological parameters of the vulnerable road user,
   wherein the message is sent from a road side unit, the road side unit dividing a plurality of vehicles including the vehicle into one or more groups according to destination of the plurality of vehicles so that at least one or more vehicles including the vehicle in a same group have same destination, and receive same message on a basis of group, and
   wherein the processing circuitry is configured to control the vehicle to avoid the vulnerable road user based on the message including the physiological parameters of the vulnerable road user.

2. The electronic apparatus according to claim 1, wherein the processing circuitry is further configured to:
   determine whether a current time is within the effective time of the message;
   determine whether a position of the electronic apparatus is within the effective range of the message; and
   forward the message, in a case where the current time is within the effective time of the message and the position of the electronic apparatus is within the effective range of the message.

3. The electronic apparatus according to claim 2, wherein the processing circuitry is further configured to:
   discard the message, in a case where the current time is not within the effective time of the message or the position of the electronic apparatus is not within the effective range of the message.

4. The electronic apparatus according to claim 1, wherein the effective time of the message comprises a start time of the message and an end time of the message.

5. The electronic apparatus according to claim 1, wherein the effective range of the message comprises a position of a message source and an effective radius of the message.

6. The electronic apparatus according to claim 1, wherein the message further comprises a priority of the message, and
   wherein the processing circuitry is further configured to:
   determine, according to the priority of the message, an order of forwarding the message.

7. The electronic apparatus according to claim 1, wherein the message comprises a basic safety message, a map message, a road side unit message, a road side safety message, a Radio Technical Commission for Maritime services differential signal message or a signal lamp message.

8. The electronic apparatus according to claim 1, wherein the processing circuitry is further configured to:

receive the message from the road side unit, other vehicle or a network side apparatus.

9. The electronic apparatus according to claim 1,
wherein the vulnerable road user is at least one of a cyclist, an electric biker, a rider of a motorcycle, or a pedestrian, and
wherein the message from the vulnerable road user is transmitted via a wearable electronic device, a handheld electronic device, or an electronic device integrated in at least one of a bicycle, an electric vehicle or the motorcycle for the vulnerable road user.

10. The electronic apparatus according to claim 9,
wherein the physiological parameters of the vulnerable road user include at least one of a height of the vulnerable road user, an age of the vulnerable road user, a gender of the vulnerable road user, a blood pressure of the vulnerable road user, type information of the vulnerable road user, or speed information of the vulnerable road user.

11. The electronic apparatus according to claim 10,
wherein the physiological parameters are retrieved by a sensor mounted on at least one of the wearable electronic device, the handheld electronic device, or the electronic device integrated in at least one of the bicycle, the electric vehicle or the motorcycle for the vulnerable road user, or
wherein the physiological parameters are manually input by the vulnerable road user through a user interface of at least one of the wearable electronic device, the handheld electronic device, or the electronic device integrated in at least one of the bicycle, the electric vehicle or the motorcycle for the vulnerable road user.

12. The electronic apparatus according to claim 11,
wherein the processing circuitry is further configured to determine to control the vehicle to avoid the vulnerable road user, under a condition that the vulnerable road user is old, the vulnerable road user has a high blood pressure, or the vulnerable road user has a high temperature, based on the physiological parameters of the vulnerable road user.

13. The electronic apparatus according to claim 11,
wherein the processing circuitry is further configured to determine to control the vehicle to avoid the vulnerable road user, under a condition that a speed of the vulnerable road user is greater than a predetermined threshold, based on the physiological parameters of the vulnerable road user.

14. A wireless communication method performed by an electronic apparatus for a vehicle, comprising:
receiving a message comprising an effective time of the message and an effective range of the message; and
determining, according to the effective time of the message and the effective range of the message, whether to forward the message,
wherein, further comprising receiving the message from a vulnerable road user, the vulnerable road user representing a traffic participant whose transportation means is not a vehicle, the message comprising physiological parameters of the vulnerable road user, and
wherein further comprising controlling the vehicle to avoid the vulnerable road user based on the message including the physiological parameters of the vulnerable road user,
wherein the message is sent from a road side unit, the road side unit dividing a plurality of vehicles including the vehicle into one or more groups according to destination of the plurality of vehicles so that at least one or more vehicles including the vehicle in a same group have same destination, and receive same message on a basis of group.

15. The wireless communication method according to claim 14, wherein the determining whether to forward the message comprises:
determining whether a current time is within the effective time of the message;
determining whether a position of the electronic apparatus is within the effective range of the message; and
forwarding the message in a case that the current time is within the effective time of the message and the position of the electronic apparatus is within the effective range of the message.

16. The wireless communication method according to claim 15, wherein the determining whether to forward the message comprises:
discarding the message in a case that the current time is not within the effective time of the message or the position of the electronic apparatus is not within the effective range of the message.

17. The wireless communication method according to claim 14, wherein the effective time of the message comprises a start time of the message and an end time of the message.

18. The wireless communication method according to claim 14, wherein the effective range of the message comprises a position of a message source and an effective radius of the message.

19. The wireless communication method according to claim 14, wherein the message further comprises a priority of the message, and
wherein the wireless communication method further comprises: determining an order of forwarding the message according to the priority of the message.

20. A non-transitory computer-readable storage medium including computer executable instructions, wherein the instructions, when executed by an electronic apparatus, cause the electronic apparatus to perform a method, the method comprising:
receiving a message comprising an effective time of the message and an effective range of the message; and
determining, according to the effective time of the message and the effective range of the message, whether to forward the message,
wherein, further comprising receiving the message from a vulnerable road user, the vulnerable road user representing a traffic participant whose transportation means is not a vehicle, the message comprising physiological parameters of the vulnerable road user, and
wherein further comprising controlling the vehicle to avoid the vulnerable road user based on the message including the physiological parameters of the vulnerable road user,
wherein the message is sent from a road side unit, the road side unit dividing a plurality of vehicles including the vehicle into one or more groups according to destination of the plurality of vehicles so that at least one or more vehicles including the vehicle in a same group have same destination, and receive same message on a basis of group.

* * * * *